Jan. 20, 1953 E. M. MILLER 2,626,342
COFFEE MAKER
Filed May 20, 1947 3 Sheets-Sheet 1

INVENTOR.
EARL M. MILLER
BY Fay, Golrick & Fay
ATTORNEYS

Jan. 20, 1953  E. M. MILLER  2,626,342
COFFEE MAKER

Filed May 20, 1947  3 Sheets-Sheet 2

INVENTOR.
EARL M. MILLER
BY Fay, Golrick & Fay
ATTORNEYS

Jan. 20, 1953  E. M. MILLER  2,626,342
COFFEE MAKER
Filed May 20, 1947  3 Sheets-Sheet 3

INVENTOR.
EARL M. MILLER
BY Fay, Golrick & Fay
ATTORNEYS

Patented Jan. 20, 1953

2,626,342

UNITED STATES PATENT OFFICE 2,626,342

COFFEE MAKER

Earl M. Miller, Euclid, Ohio, assignor to Max Freedman, Cleveland Ohio

Application May 20, 1947, Serial No. 749,219

11 Claims. (Cl. 219—43)

This invention is concerned with improvements in coffee makers of the instantaneous drip ground type wherein cold water is metered over an electrical heating element and is then distributed over the coffee grounds disposed in the usual coffee-ground basket. The general object of the present invention is the provision of cold water passageways arranged in such manner relative to the heating element that a continuous metered flow of the cold water through the heating element will be assured throughout a long period of usage of the utensil.

More specifically, the present invention is directed to improvements of the instantaneous coffee maker disclosed and claimed in my Patent No. 2,272,471, issued February 10, 1942, and a further object is to produce a heating unit structure which can be made moisture proof in a practical production manner.

Other objects and advantages of the invention will be apparent from the following detailed description of preferred forms of embodiment of the invention, reference being made to the accompanying drawings wherein—

In coffee makers of the type to which the present invention is concerned the cold water receptacle has formed in the bottom thereof, or connected to the bottom thereof in some manner, a gravity flow metering device in the form of a small orifice of predetermined diameter to control the flow of cold water from the top receptacle to the region of the electric heating element at the rate of about one cup per minute. Such a flow orifice has a diameter of about .053 of an inch.

The heating unit is constructed in the form of an annular casing in which is disposed a pancake type resistance heating element enclosed and protected by a heat conducting structure and the casing encloses thermostatic means to prevent over heating when water is absent. The electrical capacity of the heating element is such as to produce a sufficient number of heat units to raise the cold water to an approximate boiling point as the water flows into contact with the heat conducting structure. The heat conducting structure is arranged to enclose and protect the heating element from corrosion, moisture, shorts, etc., in such manner as to not interfere with the obtaining of a sensitive response from a simple thermostatic means.

I have found that while the general overall performance of such coffee makers has been satisfactory, several problems became apparent when the same were placed in production. For example, in a structure such as is disclosed in my prior patent, the metering orifice was formed in a clamping sleeve which serves to clamp the false metallic bottom of the cold water receptacle to the housing unit. This orifice structure was directly associated with a cold water container bottom which was clamped directly to part of the heat conducting means. The primary heat conducting surface of the heating mechanism comprised the bottom surface of the housing and a cup-shaped water holding means was provided immediately beneath the heat transferring surface. The water flowed over the top edge or perimeter of this cup member while flowing outwardly along the heat transferring surface. I have found that in such an arrangement there was a tendency for bubbles to form adjacent the metering orifice, and also steam pockets formed, which interfered with the uniform flow of the cold water through the orifice under the influence of gravity. Also, in such an arrangement, I encountered difficulty in always obtaining a sealed housing which would prevent the ingress of moisture, and when such moisture was present the heating element, when functioning, would cause pressure to develop within the housing which had a tendency to warp some of the parts of the heating unit and thus increase the leakage condition. Also, I discovered that the distribution of the volume of metal present in that part of the structure immediately directed to heating the flowing water must be considered if a simple thermostatic switch means is to be used.

Figure 1:
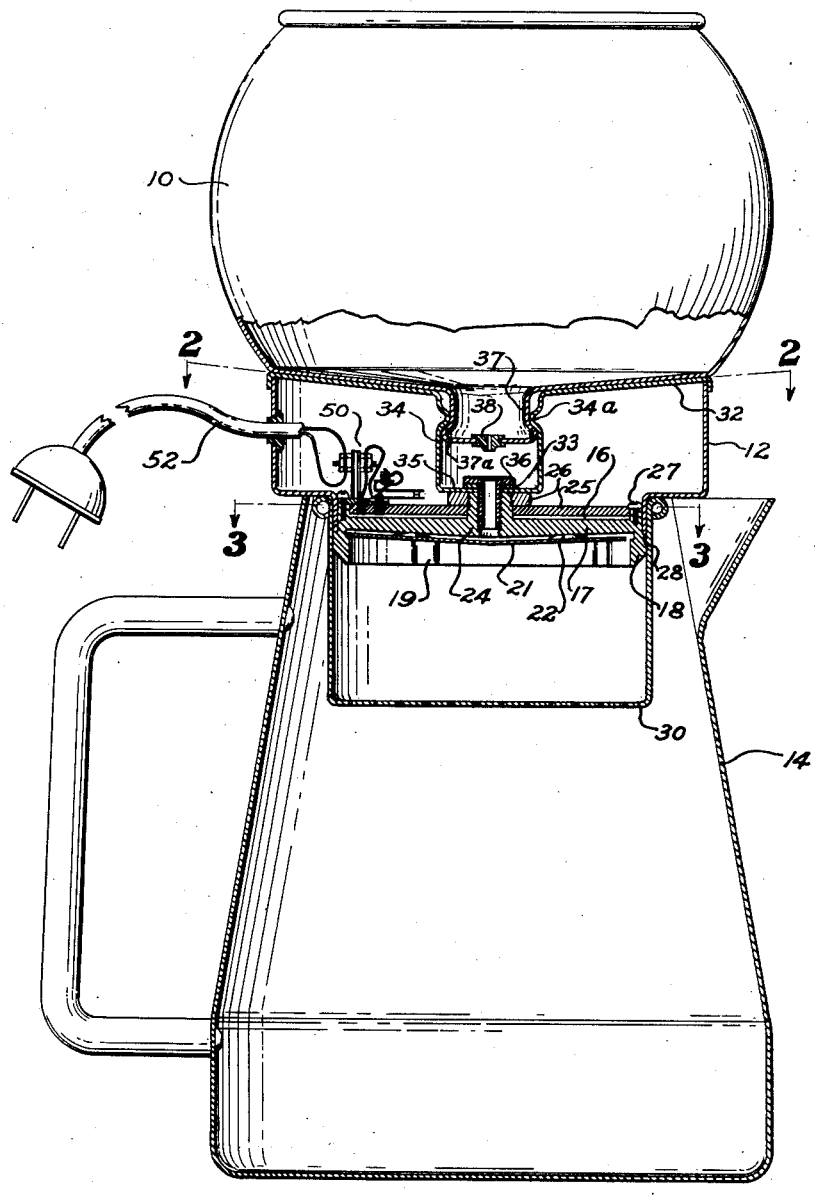
Fig. 1 is a cross-sectional view of a coffee making utensil utilizing the features of the present invention.

Referring to the drawings, I show in Fig. 1 a coffee-making utensil comprising a cold water receptacle 10 which may be formed either of glass or metal. The water receptacle rests upon an annular housing structure 12, the housing structure being shaped to set upon the coffee pot 14. The heating element proper is indicated by the space 16 in Fig. 1 and is seated on the top side of a heat conductor member 17, preferably formed of cast metal. The conductor member 17 has an annular flange 18 depending therefrom to engage in slip fashion the coffee grounds basket. This flange 18 is provided with a bayonet lock arrangement, as indicated at 19, for the reception of lugs 20 formed on a slightly coniform water spreading disk 21. The water spreading disk is disposed in a slightly spaced relation to the under slightly coniform surface of the conductor member 17, there being bosses or lands 22 struck up from the surface of the disk 21 to determine such spacing.

The heat conducting member 17 is provided with a central upwardly extending hub formation 24 which is both internally and externally threaded. The heating element 16, which is usually insulated with mica, is held in firm contact with the upper surface of the heat conducting member 17 by a metallic disk 25, which is secured in clamped relation to the insulation of the heating element by a nut 26 in threaded engagement with the hub formation 24 and by screw members 27 disposed about the perimeter thereof.

The housing 12, as shown in Fig. 1, comprises a drawn sheet metal formation having an annular depending flange 28 dimensioned to press fit the circumferential surface of the heat conducting member 17. The coffee-grounds basket 30 is dimensioned to snugly slip fit over the annular surface of the flange 18 of the heat conducting member 17 and over the surface of the annular flange 28 of the housing member 12.

The housing member 12 is closed at the top by a flanged disk member 32 of slightly coniform formation and the member 32 has a deeply drawn depression 34 formed at the center thereof. The bottom wall 35 of this depressed formation 34 is perforated and a hollow or sleeve-shaped nut 36 engages the internal threads of the hub structure 24 of the heat conductor member 17 whereby the nut 36 serves to firmly clamp the member 32 to the heating unit assembly and to the top perimeter of the housing 12. A washer 33 seals this connection against water seepage to the heating element.

The cold water vessel 10 has a central depression 37 formed on the bottom wall thereof and secured to the bottom of depression 37 is an orificed metering member 38. A connection between the cylindrical walls of the depressions formed in the disk 32 and bottom wall of the container may be provided as will be described.

The relative depths of the depressions formed in the disk member 32 and the bottom of the cold water receptacle are such that a substantial space is provided between the bottoms thereof, as shown in Fig. 1. I have found that such a space will prevent the formation of air bubbles over or adjacent the under side of exit end of the orifice of member 38, and this space also provides a cavity of sufficient size for the presence of incidental vapor without interfering with the gravitational flow of the water at the desired rate. I have also found that by having the orifice member thus spaced away from the heating unit the orifice member 38 never reaches sufficient temperature to cause the formation of residues, such as calcium, from the water, since the water when passing through the orifice is never heated to a sufficient temperature to cause deposits.

Figure 2:
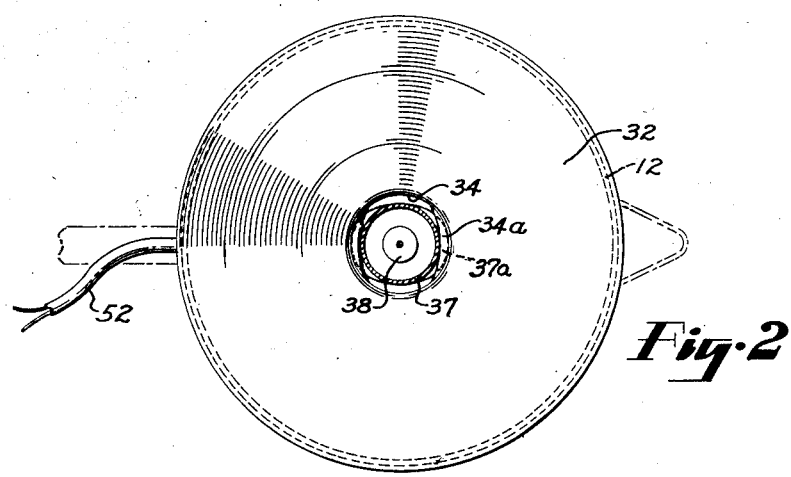
Fig. 2 is a cross-sectional view taken substantially along the line 2—2 of Fig. 1.
Figure 3:
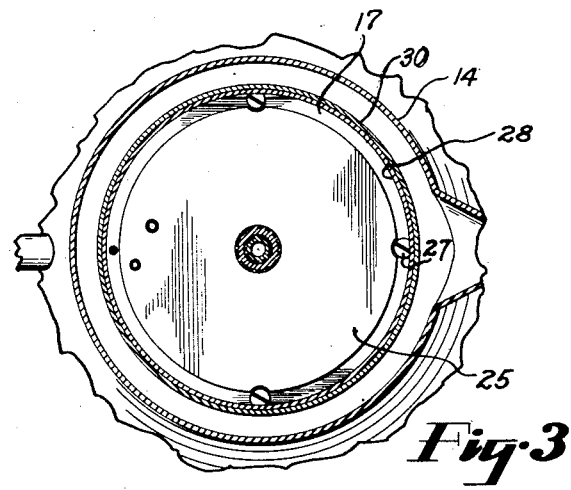
Fig. 3 is a cross-sectional view taken substantially along the line 3—3 of Fig. 1.
Figure 4:
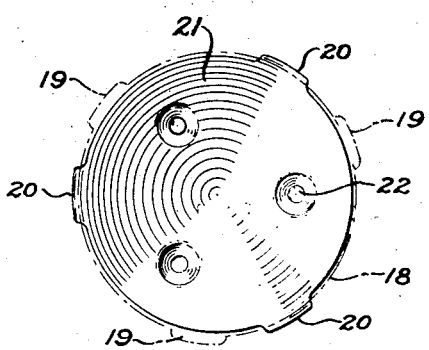
Fig. 4 is a top plan view of the hot water distributing member comprising part of the structure shown in Fig. 1.

Various means may be utilized to temporarily secure the cold water vessel 10 to the housing structure 12. For example, in Fig. 1 I have shown a thread formation 34$^a$ formed in the wall of the depression 34 of the housing top disk 32 and a corresponding interrupted annular formation 37$^a$, which will be more readily apparent as viewed in Fig. 2. In this arrangement the bottom of the cold water receptacle 10 is brought down into firm clamping relation to the top surface of housing disk 32.

Figure 5:
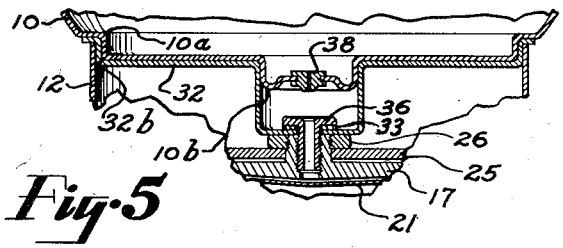
Fig. 5 is a cross-sectional view showing a modification of the water metering arrangement.

In Fig. 5 I have shown a modification whereby the cold water receptacle 10 is held in position on the heating unit. The disk 32 has a major depression formed therein to effect a press fit between an annular wall of the housing 12 and shoulder 32$^b$, as shown in Fig. 5. A corresponding depression 10$^a$ is formed in the bottom wall of the cold water receptacle to tightly fit in the depression of the disk member 32. The extent of the central depression formed in the bottom wall of the receptacle 10 is decreased and the bottom of the depression is shaped to provide an annular ridge 10$^b$, which serves to protect the outlet end of the orifice member 38 when the cold water vessel is removed from the heating unit. The disk 32 is held in assembled position in the manner already described by sleeve nut 36.

Figure 6:
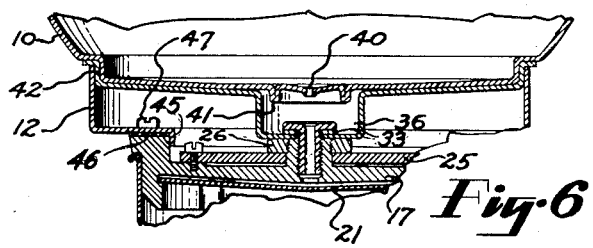
Fig. 6 is a further modification of the water metering arrangement.

In Fig. 6 I show a further modification wherein the orifice 40 is formed directly in the bottom wall of the cold water receptacle 10 and a protecting ridge 41 is provided by crimping the bottom wall structure as shown. A slip fit is provided at 42 for holding the cold water vessel after the manner described with reference to the structure shown in Fig. 5.

In Fig. 1 a thermostatic mechanism and terminal connecting means are shown in a more or less conventional manner, generally indicated by the reference numeral 50, but the same comprises no part of the present invention. Connected to the terminals is the usual cord 52, which I prefer to use as distinguished from a socket plug connection, since the presence of the cord extending into the housing of the heating unit tends to discourage immersing of the heating unit in dish water.

It will be noted that the orifice means has been removed from all direct heat conduction relationship with any of the members comprising the heating means and under no circumstances, except those of extreme carelessness, will there be any change of the orifice structure becoming sufficiently heated to cause residues to form therein.

The operation of the utensil is quite simple. Coffee grounds of the proper fineness and to an amount corresponding to the desired cups of coffee are placed in the basket and the latter is slip fitted to the flange 18. The cord is connected to a source of power and a volume of cold water is placed immediately in the cold water vessel to the extent of the desired cups. The water flows through the metering orifice and does not encounter any of the heated members until it has passed through the orifice. Thereafter the water flows through the sleeve nut 36 and through the hollow hub 24 of the heat conductor member 17 and on to the imperforate spreader plate 21. Since the spacing between the plate and under heating surface of the heat conductor member 17 is shallow, a film-like volume of water flows constantly radially outwardly and slightly upwardly and escapes over the perimeter of the spreader disk. During this journey the flow rate is such that the water has been brought almost to the boiling point. Some of the water falls toward the basket wall and some follows the under surface of the spreader plate and drops over the entire top surface of the coffee grounds. Should the user fail to detach the cord when the cold water vessel is empty, the thermostatic mechanism will prevent overheating of the electrical element.

If desired, the connection between the housing member 12 and the heat conducting member 17 of the Fig. 1 construction may take the form of an internal tight fit, as shown at 45 in Fig. 6. A gasket 46 is compressed by internally disposed screw members 47.

Figure 7:
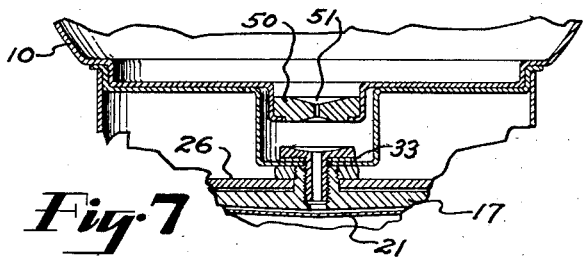
Figs. 7, 8 and 9 show other modifications.

In Fig. 7 I have shown the orifice means as comprising a plug 50 pressed into the bottom depression of the cold water container. The upper and lower surfaces of the member 50 are beveled or coniform shaped and the result is a modified Venturi action on the water passing through orifice 51. In this arrangement the center part of the bottom wall of the depression is omitted to the extent shown to expose the under side of the plug.

Figure 8:
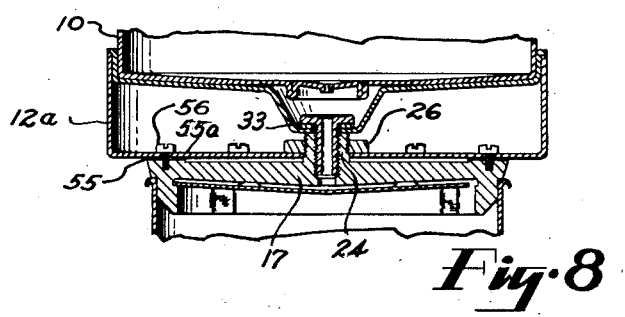

In Fig. 8 I have shown still another manner of connecting the heat conducting member 17 to the housing. Housing 12ᵃ has the bottom 55 thereof formed to extend horizontally all the way to the hub structure 24, thus serving the purpose of the clamping plate 26. Gasket 55 and screws 56 are used in this construction to effect a water-tight joint between member 17 and the housing.

Figure 9:
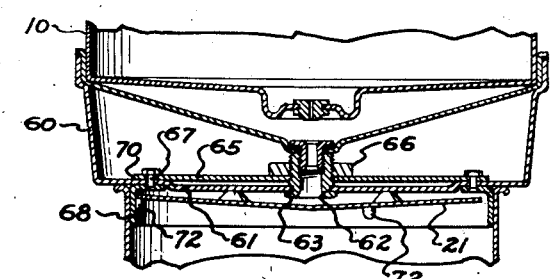

In Fig. 9 I show another modification of the structure of the heating unit and wherein drawn and stamped sheet metal members comprise the unit. In this arrangement a relatively heavy gauge sheet is drawn to the shape of the housing member 60. Here the housing serves also as the heat conductor by means of portion 61. The hub formation 62 comprises an internally and externally threaded sleeve. This sleeve is welded or aluminum soldered at the bottom thereof at joint 63 to insure a water-tight joint under all conditions of use and abuse. In this arrangement the element clamping plate 65 is held down at the hub by nut 66. The outer portion of plate 65 is held down by a series of screw bolts 67. Bolts 67 serve also to fasten a basket holding member 68 to the under side of the housing member 60. Gasket 70 serves to seal the bolt connections and if desired a suitable sealing compound may be used. Member 68 has inwardly struck lugs 72 for engaging the outer edge of the spreader plate in bayonet lock fashion.

In the construction shown in Fig. 9 the flange structure comprising the basket holding member 68 may be soldered or welded to the under side of the housing member 60 and screw fasteners for the plate 65 may be used which would not extend completely through the members 60 and 68. This arrangement would eliminate the use of sealing compound at the bolt holes.

It will be noted that in all of the structures shown the metering means is relatively remote from the heating unit. Also, by having a slightly coniform bottom surface, any slightly tilted position will not cause the heated water to escape from the spreader plate on one side of the center of the housing unit.

I claim:

1. In a coffee maker of the metered flow type the combination of an electrical heating element, a heat conducting means supporting and enclosing the element comprising a housing structure with the under side thereof exposed, the surface of the under side serving as a heat transferring surface, a plate spaced from said heat transferring surface and extending in substantially uniformly spaced relation to said heat transferring surface throughout said heat transferring surface to form a shallow water cavity, a hollow hub structure extending upwardly from the inner central region of the housing structure, there being a cold water passageway establishing water flow communication between said under heat transferring surface and the hollow hub structure, an annular flange in the housing structure extending upwardly from the region of the heating element, a top closure wall for said housing having a central opening and the portion of said closure wall extending from the inner side of the annular flange to the top of said hub structure being in the form of an inverted cone with the apex at the upper end of said hub structure, and a cold water receptacle having a bottom structure depressed to extend downwardly toward the hub structure, said bottom depression having a cold water metering orifice formed therein to overlie the hollow part of the hub structure, the top closure wall and bottom of the cold water receptacle being out of contact throughout the major extent thereof.

2. In a coffee maker of the metered flow type, a water heating unit adapted to be mounted over a coffee pot, said unit comprising a housing having a top wall with a recess therein in the form of an inverted cone converging to a centrally located water passageway, an electric water heating means in the housing comprising a heating plate having a tubular structure extending upwardly and opening into the bottom of said recess and water passageway thereof for feeding water to the region of the heating plate, a cold water receptacle adapted to be positioned over said top wall with the central portion of the bottom wall thereof depressed and having a water metering orifice in said central depression for metering water into the said recess, the diameter of the opening through said tubular structure being substantially greater than the diameter of the metering orifice.

3. In a coffee maker of the metered flow type, the combination of an electric heating element, a heat conducting means supporting and enclosing the element comprising a housing structure, the under side surface of which serves as a heat transfer surface, said housing structure having an upper wall provided with a central opening, a centrally located annular wall structure comprising part of the housing structure and so arranged as to provide a central cavity upwardly exposed, there being a water passageway between the upwardly exposed cavity and the under heat transferring surface of the housing structure, said housing structure having an annular flange extending upwardly from the region of the heating element locus to serve as a retainer for the bottom of a cold water receptacle, a cold water receptacle having the bottom of the side wall thereof cylindrical to telescope into the annular flange of the housing structure and the cold water receptacle bottom wall having a centrally located depression formed therein to extend downwardly into the upwardly exposed central cavity of the housing structure and which is provided with a cold water metering orifice disposed within the said upwardly exposed housing cavity when the cold water receptacle is placed upon the top of the housing structure.

4. In a coffee maker of the metered flow type, a water heating unit adapted to be mounted over a coffee pot and a cold water receptacle adapted to be positioned detachably upon said unit; said unit including a top wall depressed downwardly to a central aperture formed therein, a cylinder body supporting at its upper end said top wall and having at its lower end an inwardly extending circumferential portion, an electric water heating means carried by said inwardly extending portion comprising a heating plate with an electric heating element enclosed therein and having a tubular structure extending upwardly to meet the apertured portion of said top wall, said tubular structure opening at its upper end to the lower-most portion of the upper surface of said top wall and at its lower end opening through the heating plate for feeding cold water from the upper side of said heating unit to the underside of the heating plate, and a second plate spaced from said underside of the heating plate to form a shallow water flow cavity between the last said plate and said heating plate; and said cold water receptacle having in its bottom a central depression extending downwardly within the depressed portion of said top wall, said central depression having a cold water metering orifice aligned with said tubular structure and the said central aperture of the depressed top wall, whereby a cavity is provided beneath said central depression of the cold water receptacle.

5. A coffee maker structure such as that defined in claim 4 in which the top wall of said heating unit is provided with an upwardly extending cylindrical portion at its periphery and in which the periphery of the bottom wall of the cold water receptacle has a cylindrical formation adapted for manually detachable press fitting into the said cylindrical formation for retaining the cold water receptacle on the heating unit.

6. A coffee maker structure such as that described in claim 5 in which the said depressed top wall is formed with a cylindrical depression concentric with the aperture of said top wall, into which depression extends the said bottom depression of said cold water receptacle.

7. A coffee maker structure such as that described in claim 6, wherein the bottom depression of the cold water receptacle is of a cylindrical form fitted into the cylindrical depression of said top wall.

8. A coffee maker structure such as that described in claim 4 having the top wall of said heating unit provided with an upwardly extending cylindrical portion at its periphery, the periphery of the bottom wall of the cold water receptacle having a cylindrical formation adapted for manually detachable press fitting into the said cylindrical formation for retaining the cold water receptacle on the heating unit, in which the bottom of the cold water receptacle and the top wall of the heating unit are out of contact throughout the major extent thereof.

9. A coffee maker structure as described in claim 4, in which said depressed top wall is formed with a cylindrical depression concentric with the central aperture of said top wall, the cylindrical wall thereof having an interrupted inwardly projecting circumferential formation, the bottom wall of the said cold water receptacle being supported over its major extent by that portion of the said top wall extending outwardly from the said cylindrical depression, and the central depression of said bottom wall of the cold water receptacle being cylindrical in form with outwardly extending projections adapted for cooperation with said interrupted formation for removably attaching said receptacle to said heating unit.

10. A coffee maker structure such as that described in claim 4 in which said inwardly extending circumferential portion of the said cylindrical body extends inward to said tubular structure to form a clamping plate for clamping the element and to provide the top surface of said heating plate.

11. A coffee maker structure such as that described in claim 4 in which said inwardly extending circumferential portion of the said cylindrical body is integrally formed with said heating plate.

EARL M. MILLER.

REFERENCES CITED

The following references are of record in the file of this patent:

UNITED STATES PATENTS

| Number | Name | Date |
|---|---|---|
| 1,838,206 | Alaj | Dec. 29, 1931 |
| 2,143,046 | Wilcox | Jan. 10, 1939 |
| 2,215,837 | Pinckney | Sept. 24, 1940 |
| 2,245,238 | Watson | June 10, 1941 |
| 2,272,471 | Miller | Feb. 10, 1942 |